I. Gregg,
Brick Machine.
No 177. Reissued Sep. 17, 1850.
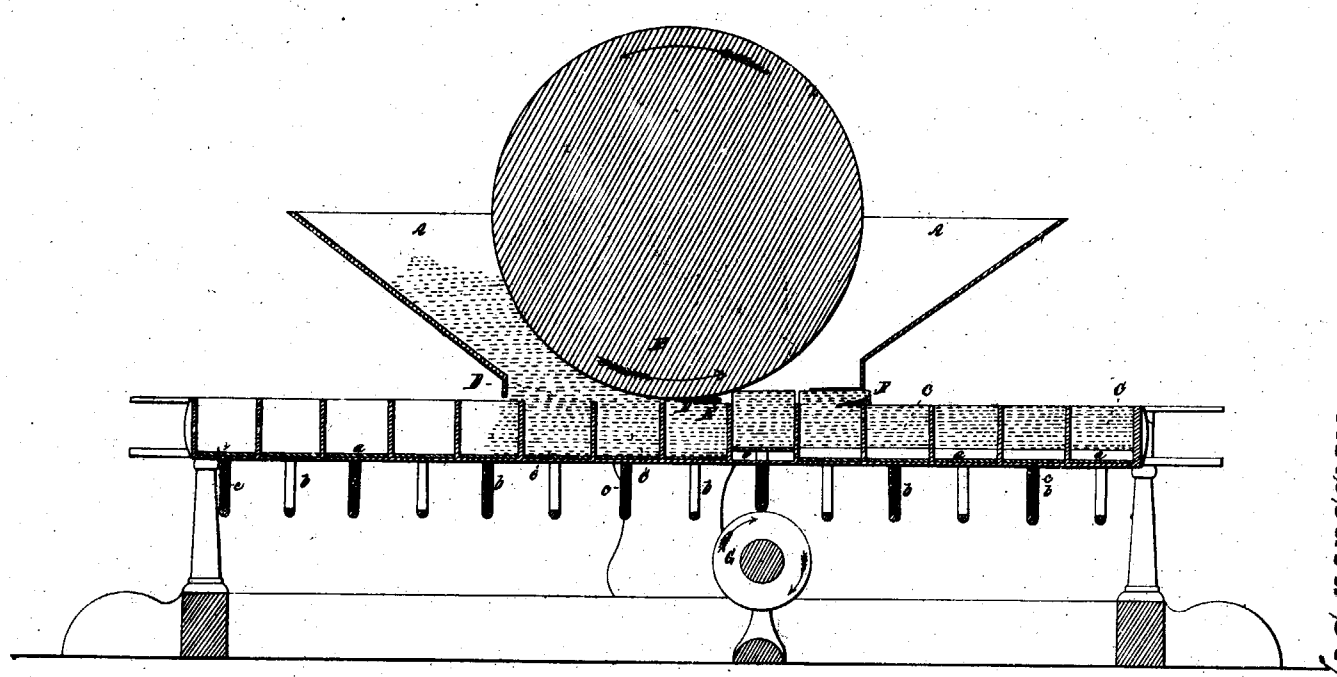
THE NORRIS PETERS CO., WASHINGTON, D. C.

UNITED STATES PATENT OFFICE.

ISAAC GREGG, OF PHILADELPHIA, PENNSYLVANIA.

IMPROVEMENT IN BRICK-PRESSES.

Specification forming part of Letters Patent No. 5,618, dated June 6, 1848; Reissue No. 177, dated September 17, 1850.

*To all whom it may concern:*

Be it known that I, ISAAC GREGG, (formerly of Pittsburg, Pennsylvania,) of the city and county of Philadelphia, in the State of Pennsylvania, have invented a new and useful improvement in the manner of constructing presses for pressing of bricks from unwrought or dry clay, for which Letters Patent of the United States were granted to Thomas Culbertson, of Cincinnati, in the State of Ohio, under date of the 16th of May, 1846; and I do hereby declare that the following is a full and exact description thereof.

In its general construction and operation the machine is similar to that patented by said Culbertson, the clay being thrown into a hopper containing a heavy roller, by which roller the clay is forced through an opening in the bottom of the hopper, under which a series of molds are made to pass back and forth by means of a pitman or other equivalent contrivance.

In the original machine there was a single knife, E, which was used to cut off the superfluous clay from the upper surfaces of the molds immediately after they had passed the roller, for the purpose of giving a good surface to the upper portion of the brick; but this it has entirely failed to do, the upper surface and angles being left extremely rough and crumbly from want of the necessary compactness of the clay on the surface. My improvement obviates this difficulty entirely.

It consists in making the molds about half an inch (more or less) deeper than heretofore, so as to give that additional thickness to each brick at the time it is acted upon by the pressure-roller B, and after this action of the roller takes place each brick is elevated a distance equal to the additional depth given to the molds and brought in contact with a knife, F, or its equivalent, which cuts off the additional thickness given to the brick; and in consequence of the action of this knife being upon the solidly-pressed clay (that received its pressure while it was within the mold) the brick is left with its upper surface and angles entirely perfect.

To enable the bricks to be raised in their molds to a suitable distance for removing their surplus thickness by the knife F, a roller, G, or an inclined plane, is placed below the molds, in such a position that the arms *b b*, that descend from the false bottoms *a a* of the molds, will strike against it, and thereby raise the bricks in succession to the desired height in the molds for the action of the knife F.

The accompanying drawing is a longitudinal and vertical sectional representation of that part of the machine that contains my improvement. A A is the hopper for containing the clay, and B the roller by which it is pressed into the molds C C C through an opening, D.

Spiral or other springs *c c* may be combined with the false bottoms of the molds for the purpose of depressing them after they have been elevated. The bricks are finally delivered from the molds in the manner described in Culbertson's machine, or in any other manner that may be deemed expedient.

What I claim as my invention, and desire to secure by Letters Patent, is—

Making the molds C C of extra depth, in combination with the elevation of the bricks in the moulds after they have been pressed a distance equal to the extra depth given to the same, and the removal of the surplus thickness of the bricks—raised above the tops of the molds by a knife or its equivalent, for the purpose of giving uniform solidity and perfection of form to the bricks prior to their final removal from the molds, substantially as herein set forth.

The above specification of my improvement in brick-presses signed and witnessed this 17th day of August, 1850.

ISAAC GREGG.

Witnesses:

PETER STEINMETZ,

WM. P. HIBBERD.